Feb. 7, 1933. H. A. WADMAN 1,896,874
GLASSWARE ANNEALING LEER AND DRIFT CONTROLLING APPARATUS THEREFOR
Filed Dec. 27, 1930 2 Sheets-Sheet 1
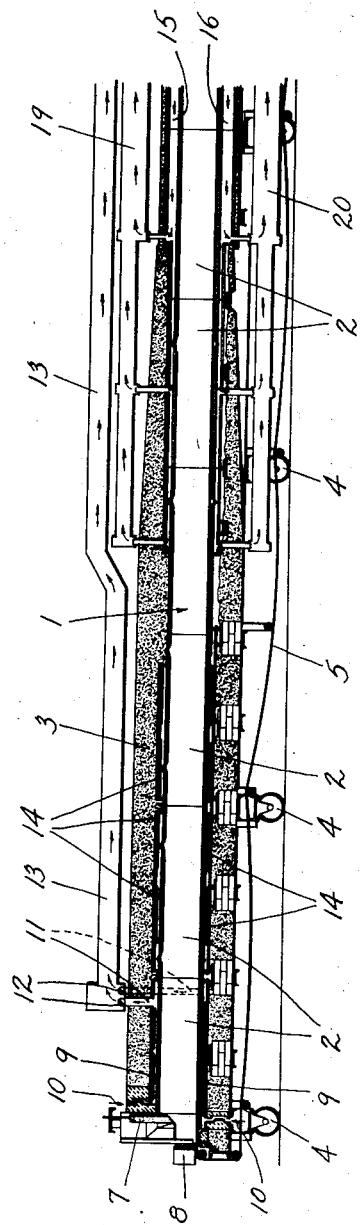
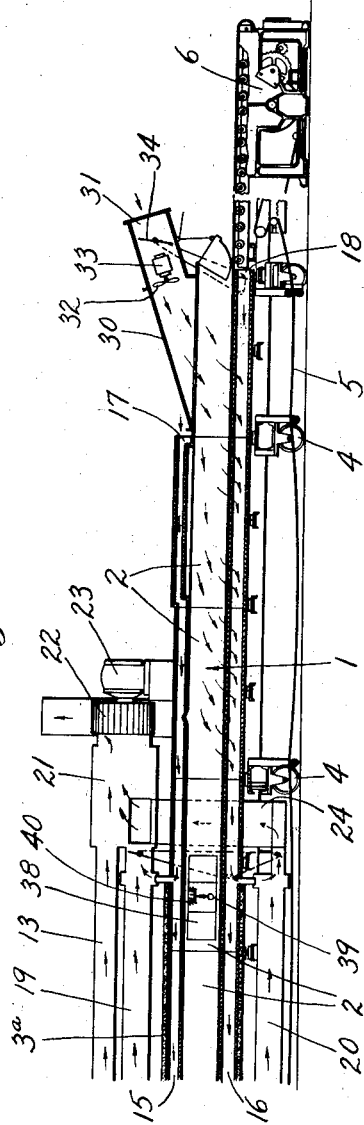
Witness:
G. A. Duley
Inventor;
Harold A. Wadman
by Brown & Parlaw
Attorneys.

Feb. 7, 1933.  H. A. WADMAN  1,896,874
GLASSWARE ANNEALING LEER AND DRIFT CONTROLLING APPARATUS THEREFOR
Filed Dec. 27, 1930  2 Sheets-Sheet 2
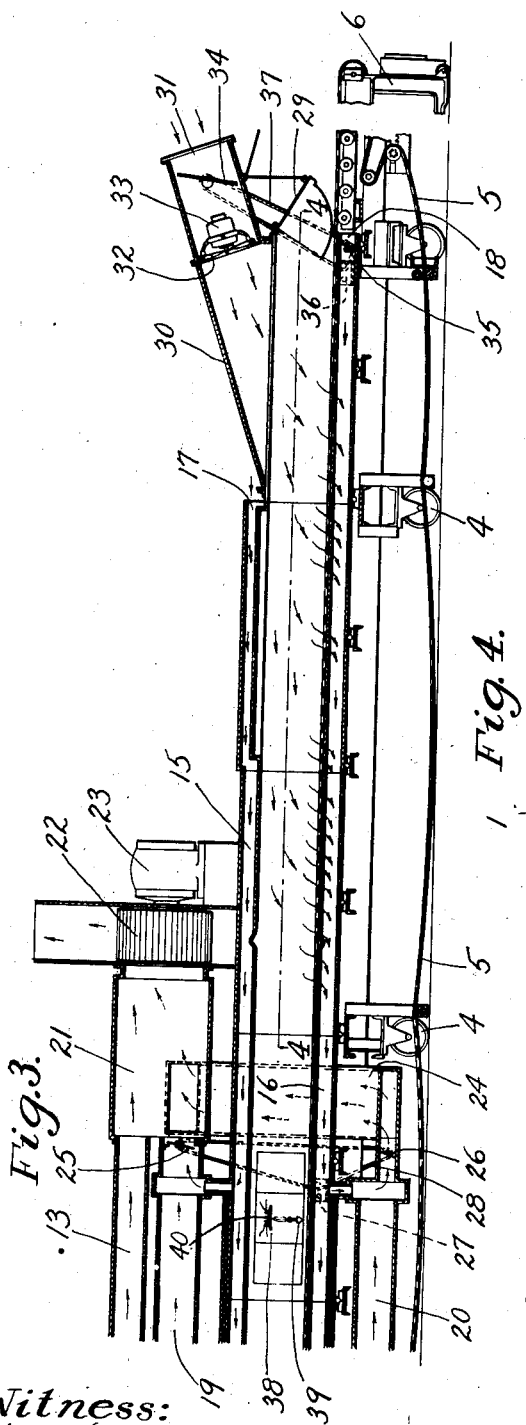
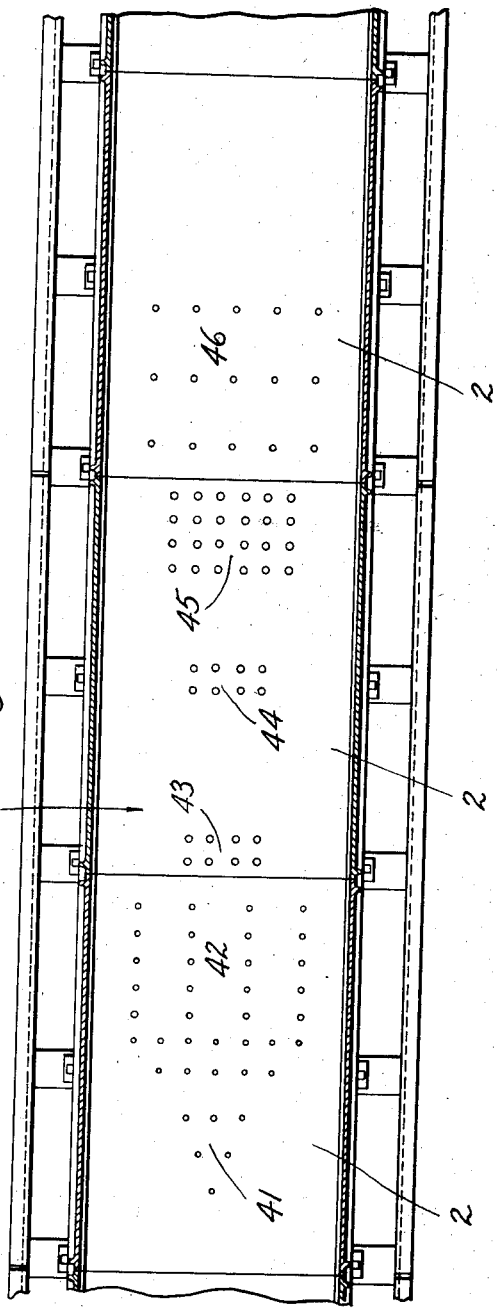
Inventor;
Harold A. Wadman Patented Feb. 7, 1933

1,896,874

UNITED STATES PATENT OFFICE

HAROLD A. WADMAN, OF HARTFORD, CONNECTICUT, ASSIGNOR TO HARTFORD-EMPIRE COMPANY, OF HARTFORD, CONNECTICUT, A CORPORATION OF DELAWARE

GLASSWARE ANNEALING LEER AND DRIFT CONTROLLING APPARATUS THEREFOR

Application filed December 27, 1930. Serial No. 505,017.

This invention relates to apparatus for annealing glassware and specifically to apparatus for cooling the ware adjacent to the exit end of a glass annealing leer and simultaneously for controlling the drift in the hotter portions of the tunnel where a controlled drift, and usually a minimum drift is desirable. The invention is in certain respects a continuation of or an improvement on the constructions shown in my copending applications, Serial No. 441,793, filed April 5, 1930, and Serial No. 389,118, filed August 29, 1929.

While the structures shown in my two copending applications above referred to are in many respects eminently satisfactory, it may in some instances be desirable not to introduce any flue gases into the interior of the tunnel into contact with the ware as is done in the constructions of my aforementioned copending applications, as such gases in some instances contain particles of soot which may harm delicate glassware especially when it is in a heated condition. Therefore, it is an object of the present invention to avoid this difficulty and still to use the broad principles of the drift control outlined in my said copending applications specifically by providing separate means for introducing atmospheric air into the tunnel in connection with my automatic drift control rather than using gases containing products of combustion.

It has also been found in annealing certain types of ware that it is desirable to accomplish a relatively rapid cooling of the ware at the later end of the annealing process by blowing atmospheric air onto and between the glass articles being annealed. While devices have been designed for blowing atmospheric air onto ware being annealed in the last stages of the annealing process such devices have not been uniformly successful for the reason that the air blown onto the ware in many cases has caused undesirable drifts through the hotter portions of the annealing leers with the result that the heat control or the control of the temperature gradient in such hotter portions has been uncertain at best.

A further object of this invention is, therefore, to provide a structure including in combination means for cooling the ware at the later stages of the annealing process by blowing atmospheric air onto and between the articles and means for positively controlling the drift through the hotter portion of the annealing leer, so that a desired temperature gradient may be maintained in such hotter portions independently of the direct application of cooling air.

Other objects and advantages of the present invention will become apparent as the description proceeds and are included in the sub-joined specification and appended claims when taken in connection with the accompanying drawings, in which:

Figures 1 and 2 together constitute a longitudinal vertical section of a glass annealing leer to which the present invention is applied, a portion of the cooling table associated with the leer being broken out in Fig. 2 and a further portion of that figure being shown substantially in side elevation;

Fig. 3 is an enlarged vertical section similar to that of Figs. 1 and 2 taken through the rear portion of a glass annealing leer to which the present invention is applied; and Fig. 4 is a horizontal section of a portion of the leer taken substantially on the line 4—4 in Fig. 3.

While the present invention is applicable to almost any tunnel type glass annealing leer and also for other analogous uses, I have chosen for purposes of illustration a leer construction substantially the same as that shown in my copending application, Serial No. 441,793, above referred to, as illustrated in Figs. 1 and 2, which together form a vertical section of substantially the entire leer, it being understood that Fig. 2 is the section at the right of Fig. 1, so that if the two figures be placed end to end they will together form a single figure showing the entire leer. Such leer comprises generally a tunnel 1, formed in sections 2, and built up in any suitable manner, preferably with a metallic lining supported in any suitable or desired manner and surrounded by a layer of insulating material 3 which may be thinner toward the exit end of the leer progressively or in steps, as indicated at 3a in Fig. 2. The leer as a whole is shown supported on wheels 4 so that it may be moved as an entirety. Glass articles are conveyed through the leer upon a suitable belt 5 which is slidably supported on the floor or bottom of the leer tunnel and which returns beneath the tunnel to the entrance end as shown in the drawings. This belt 5 may be of woven wire mesh fabric and may be driven by a suitable driving means generally indicated at 6, such means preferably being of the type shown in the patent to Ingle 1,764,791, issued June 17, 1930. The specific details of these means constitute no part of the present invention and no further description thereof will thereafter be given. The front end of the leer is provided with upper and lower gate members 7 and 8, respectively, which are preferably the same as are shown and described in my copending application, Serial No. 441,793, and which are generally of the type illustrated in the Mulholland Patent 1,571,137, issued Jan. 26, 1926, (see Fig. 2 of that patent).

At the front end of the leer shown in the first section at the left in Fig. 1 there is provided a ware-conditioning zone which may be either heated or cooled, according as the condition of the ware is cooler or hotter than that desired for further treatment. The heating means may comprise electric heating elements 9 through which a suitable current is passed at the desired times. The cooling means may be muffle flues respectively above and below the leer tunnel having air inlet passages indicated by the arrows 10, Fig. 1, and outlet passages indicated at 11 in this figure. The outlet passages may be independently controlled by dampers 12 which control communication between these passages and an exhaust conduit 13 leading to a suction fan, later to be described.

The main heat for the leer may be supplied by suitable electric resistance heating elements generally indicated at 14, which may be enclosed in suitable muffles in and adjacent to the second and third sections 2 of the leer above and below the tunnel, as indicated at the left-hand side of Fig. 1.

For controllably cooling the ware in the tunnel 1 upper and lower muffle cooling flues 15 and 16, respectively, preferably are provided, which are open to the atmosphere adjacent to the exit end of the leer, as indicated at 17 and 18, respectively, (see Fig. 3). These flues communicate with take-off conduits 19 and 20 respectively by a plurality of outlet passages shown in Figs. 1, 2 and 3. The conduits 19 and 13 communicate with a wind box 21 (Figs. 2 and 3) from which the air is continuously exhausted by a suitable suction fan 22 operated from any desired source of power as the electric motor 23. The conduit 20 also communicates with the wind box 21 through saddle pipes 24, one on each side of the leer tunnel. Communication between the conduit 19 and the wind box 21 is controlled by a damper 25 which thus controls the total flow through the upper flue 15. Similarly communication between the conduit 20 and the saddle pipes 24 leading to the wind box 21 is controlled by a damper 26, which thus controls the total flow through the lower flue 16.

As shown in the drawings, dampers 25 and 26 are arranged for simultaneous automatic operation by a reversible motor 27 connected to the dampers through a suitable sprocket chain 28 arranged to operate about three sprocket wheels, one driven by the motor 27 and the other two on the shafts carrying the dampers 25 and 26 respectively. This motor 27 may be operated to move the dampers simultaneously toward their open or closed position by manual or automatic means, but preferably is controlled by a suitable thermostat as disclosed in my copending application, Serial No. 441,793, the thermostat (not here shown) being responsive to the temperature of the ware in the tunnel at a desired point.

At the exit end of the leer is arranged a door member 29 which may be adjusted in its position with regard to the height of the ware being annealed, the desirable adjustment being one which just clears the top of the ware.

The construction thus far described is substantially identical with that specifically illustrated and described in my copending application, Serial No. 441,793, and forms merely the background for the present invention, so that no further description will be given of this structure at this time.

Arranged adjacent to the exit end of the leer tunnel, according to my present invention, is a passageway or hood 30 open at its rearward end 31 to the atmosphere, as shown. In this hood is arranged a fan 32 adapted to be driven by any suitable source of power, as an electric motor 33 for forcing atmospheric air into the tunnel in a direction generally countercurrent to the movement of the ware therethrough, which movement is from left to right, as shown in the present drawings, and also in a somewhat downwardly direction. The air thus forced in will be caused to pass onto and between the articles of ware on the conveyor 5 and thus will have a cooling effect on such articles. The amount of atmospheric air introduced is controlled by a damper 34 positioned in the passageway 30 and adapted to be controlled, as hereinafter to be specifically described, to control the amount of air being forced into the tunnel 1 of the leer.

This construction will cause a flow of air from the rear or exit end toward the entrance end of the leer. It has been found, however, that while such a construction may be, and in fact is, very efficient from the point of view of cooling glass articles on the conveyor belt, it may result in an undesirable flow of air or gaseous media through the hotter portions of the leer and interfere with the control of the temperature gradient in such hotter portions. Inasmuch as this gradient control is extremely important and in fact essential to the proper annealing of glass articles, it is necessary that some means be provided to control the flow through the hotter portions of the tunnel and in some instances reduce it substantially to zero.

In the present case, this result is obtained by withdrawing from the tunnel along a zone extending toward the entrance end of the tunnel from the point or zone of introduction of the atmospheric air an amount of tunnel atmosphere proportioned relative to the amount of atmospheric air forced into the tunnel so that the resultant drift or flow through the hotter portions of the tunnel is controlled as desired, and in some cases may be zero. For this purpose the bottom or floor of the tunnel is provided with a plurality of apertures shown particularly in Fig. 4 and indicated by the curved arrows passing through the bottom or floor of the tunnel in Figs. 2 and 3, the apertures communicating with the lower flue 16. It has been explained how the total flow through the flue 16 is controlled by the damper 26. If, then, the amount of air which is permitted to be drawn into the end 18 of the flue 16 be controlled, the amount of tunnel atmosphere drawn into this flue through the apertures shown in Fig. 4 will be determined by the difference of the first two amounts. For this purpose a damper 35 is provided to control the amount of air entering the end 18 of the flue 16.

Thus, it will be seen that by suitable setting of the dampers 34 and 35, the relative amount of air blown into the tunnel and tunnel atmosphere withdrawn therefrom may be controlled for any given setting of the damper 26; and that by a proper control of these relative amounts, the drift through the hotter portions of the tunnel is regulated at will.

I have provided automatic means for controlling the dampers 34 and 35 in a manner in some respects similar to the drift control shown and described in my copending application, Serial No. 441,793 above referred to. This means in the present instance comprises a reversible electric motor 36 connected to these dampers 34 and 35 by a suitable sprocket chain 37 passing around a sprocket driven by the motor 36 and also around sprockets on the shafts which carry dampers 34 and 35. I prefer to operate this motor 36 by automatic means actuated in response to the drift through the hotter portions of the tunnel as determined by the flow of gaseous media at an index point in the tunnel, illustrated as a shallow bay 38 (Figs. 2 and 3). In this bay is located a gas burner 39, the flame of which has little force and is normally directed upwardly or in some direction in a plane transverse of the tunnel. In alignment with this flame is a differentially responsive thermal element generally indicated at 40 and arranged so that if the flame be blown in one direction or the other longitudinally of the tunnel, the thermal element 40 will expand differentially so that its outer end will be moved one way or the other to make an electric contact on one side or the other, which will be effective through a suitable relay system to operate the motor 36 in one direction or the other. The details of such an arrangement form no part of the present invention, but specifically form the subject matter of my copending application, Serial No. 389,118, above referred to. It is deemed unnecessary therefore to set forth the specific construction of the parts or connections of the electric circuit for operating the motor 36.

In connection with the simultaneous control of dampers 34 and 35, the arrangement of sprocket chain 37 and the position of the dampers is such that both dampers are opened or closed simultaneously. This results in a cumulative control which will be best brought out by an example of the operation thereof. Assuming a drift to exist in the hotter portion of the leer, from left to right as seen in the accompanying figures, the reason for this drift is that a larger volume of gaseous media is being withdrawn from the tunnel than is being supplied, so that the effect of suction is predominant inasmuch as the point of application of both the inlet and outlet or pressure and suction for the media in the tunnel is at the right of the index point as illustrated in the accompanying drawings. With this condition existing, the flame from the burner 39 will be blown to the right, as seen in Figs. 2 and 3, which will cause the thermal element 40 to be differentially heated so that the right-hand side thereof will expand to a greater extent than the left-hand side. As the thermal element 40 used is anchored at its inner end, the outer end thereof will be moved to the left. This will complete an electric circuit which will actuate the motor 36 to rotate its sprocket in a clockwise direction, as seen in Fig. 3, which will cause the simultaneous partial opening of the dampers 34 and 35. The opening of the damper 34 will increase the amount of air projected into the tunnel by the fan 32. The opening of the damper 35 will increase the effective opening of the flue 16 at its end 18 and thus decrease the effective suction through the apertures between this flue and the interior of the tunnel, so as to decrease the amount of tunnel atmosphere withdrawn into the flue 16 both of which changes operate to correct the drift condition assumed. Thus, it will be seen that the effects of the adjustment of these two dampers is cumulative.

It is also desirable, if not essential, in glass annealing leers that the cooling of the ware be carried on progressively in order that there be no sudden chilling effect on the ware which might disrupt it in the process of cooling. Specifically, when the cooling is to be carried on as in the present case by blowing atmospheric air directly onto and between the articles being cooled, it is desirable to control the flow of such air, so that the cooling effected thereby is progressive. One way of accomplishing this object is to provide progressively increasing effective cross-sectional areas of openings in the floor or bottom of the tunnel toward the exit end of the leer, which is substantially the arrangement shown in Fig. 4. In this figure are shown a plurality of groups of openings or apertures, which may in practice include larger holes or more numerous holes or both, toward the exit end of the leer. In the example shown the triangular groups of holes 41 may be very small both in number and diameter, for example six holes of ⅜" in diameter, the group 42 may be slightly larger, for example, a larger number of holes of ½" in diameter. Groups 43, 44, and 45, may be larger in diameter, for example 1", and may also be more numerous toward the exit end of the tunnel. Group 46 may or may not be provided and in the present instance may be a relatively few widely spaced holes of substantially ¾" in diameter. While I have shown a particular grouping of holes and specify certain sizes for such holes which may be used in one embodiment of the invention, it is clear that any other arrangement or sizing of the holes may be used, the sizing and arrangement preferably providing progressively increasing effective cross-sectional areas of openings toward the exit end of the leer. Any arrangement or sizing of a plurality of apertures having this general result is to be deemed within the purview of my invention.

In order to provide for the continuous and successful operation of a leer embodying my present invention there must be uninterrupted provision for the establishment of suction in the lower flue 16, as otherwise one of the essentials of the drift control arrangement hereinabove described, would be lacking. At the same time it is desired that the upper and lower cooling flues 15 and 16 be controlled as to their total flow to control the cooling of the ware, preferably in response to a thermostat responsive to the temperature of the ware at a given or desired point. In order to reconcile these factors, provision must be made for keeping the damper 26 (Fig. 3) which controls the flow through the lower cooling flue 16 always open, at least to some extent, in spite of the control thereof by the motor 37. Two methods of accomplishing this object may be resorted to; and in some instances I may prefer to use both of these methods simultaneously.

The first of these methods is to so arrange the parts and particularly the sprocket chain 28 and the relative position of the two dampers 25 and 26 actuated thereby, that the damper 25 may be moved to its closed position while the damper 26 remains partly opened. Thus, if the thermostat which controls motor 27 is moved to such a position in response to relatively cool glassware that the motor will be moved to close the damper 25 completely, the damper 26 will still be partially opened to maintain suction in the lower flue 16 and thus to permit the continuance of drift control in the leer.

The other of these two methods, which as before stated may be used simultaneously with the first method, is to provide a suitable limit switch in connection with the motor 27, so that this motor cannot operate after the damper 26 has been closed to a certain predetermined extent. Inasmuch as limit switches are well known in the art of electrical control, it is deemed unnecessary to show or describe in detail this construction. By either or both of these means, there is provided a continuous and uninterrupted connection between the conduit 20 by which media from the lower flue 16 is withdrawn and the suction fan 22, so that there will be a continuous application of suction through the apertures indicated in Fig. 4 by the numerals 31 to 36 inclusive to maintain the operation of the above described drift control.

While I have shown and described but one embodiment of my invention, various substitutions or additions may be resorted to within the spirit of the appended claims.

I claim:

1. Apparatus for annealing glassware, comprising an elongate tunnel, means for conveying articles of glassware therethrough, means disposed adjacent to the exit end of said tunnel for positively blowing a current of atmospheric air into and along said tunnel in a direction generally countercurrent to the movement of the glassware, independent means for positively withdrawing tunnel atmosphere therefrom having communication with the tunnel between the entrance end thereof and that portion of the tunnel at which the air is introduced by the last named means, and automatic means responsive to gaseous flow longitudinally of the tunnel at a point therein at which it is desired to control such flow for balancing and controlling the relative amounts of gaseous media blown into and withdrawn from the tunnel to control the flow at the index point as desired.

2. Apparatus for annealing glassware, comprising an elongate tunnel, means for conveying articles of glassware therethrough, means located adjacent to the exit end of and above said tunnel for blowing atmospheric air into the tunnel in a direction downwardly and toward the entrance end thereof, means for positively withdrawing tunnel atmosphere therefrom including a suction fan, a chamber beneath a portion of said tunnel intermediate that portion of the tunnel ot which air is blown thereinto and the entrance end thereof and having a plurality of spaced openings communicating between the bottom of said tunnel and said chamber; and automatic means responsive to movement of gaseous currents longitudinally through said tunnel for controlling the relative amounts of air blown into the tunnel and tunnel atmosphere withdrawn therefrom, whereby a desired flow of gaseous medium through the tunnel will obtain at the index point.

3. Apparatus for annealing glassware, comprising an elongate tunnel, means for conveying articles of glassware therethrough, means located adjacent to the exit end of said tunnel for blowing atmospheric air therethrough in a direction generally countercurrent to the direction of ware movement through said tunnel, independent means for positively withdrawing tunnel atmosphere from said tunnel in a zone disposed substantially between the entrance end thereof and that portion of the tunnel at which atmospheric air is blown therein by the aforesaid means, said tunnel atmosphere withdrawing means including a plurality of outlet openings in the bottom of said tunnel of such size and position that the effective cross-sectional area of the openings decreases from the exit toward the entrance end of the tunnel, and automatic means responsive to movement of gaseous media longitudinally of said tunnel at an index point in the hotter portion of said tunnel for controlling the relative amounts of gaseous media blown into and withdrawn from said tunnel by the several aforesaid means for controlling the flow of gaseous media at the index point as desired, whereby ware passing through the exit end portion of said tunnel is cooled by countercurrent flow of atmospheric air and whereby flow of gaseous media through the hotter portion of said tunnel is controllable at will.

4. Apparatus for annealing glassware, comprising an elongate tunnel, means for conveying articles of glassware therethrough, an upwardly and rearwardly inclined passage communicating with said tunnel adjacent to the exit end thereof and open at its outer end to the atmosphere, a fan in said passage adapted to be continuously operated to blow atmospheric air into the tunnel in a direction generally counter-current to the movement of the ware therethrough, means for withdrawing tunnel atmosphere from the tunnel in a zone adjacent to the exit end thereof and extending toward the entrance end of the tunnel from the point of communication between said tunnel and said passage, the last named means comprising a flue beneath said zone of the tunnel having openings communicating with said tunnel and a suction fan for withdrawing gaseous media from said flue, dampers in said flue and said passage respectively, a reversible motor connected to operate said dampers simultaneously, and means located in said tunnel at a point spaced toward the entrance end thereof from said zone and responsive to flow of gaseous media longitudinally of said tunnel for controlling the operation of said reversible motor to control the position of said dampers, whereby the flow of gaseous media through the hotter portions of said tunnel and at the index point is controllable at will.

5. Apparatus for annealing glassware, comprising an elongate tunnel, means for conveying articles of glassware therethrough, means for cooling the ware in predetermined portions of said tunnel including longitudinally extending muffle flues respectively above and below said tunnel along said portions, said flues communicating with the atmosphere at their ends adjacent to the exit end of said tunnel, means for causing the flow of atmospheric air through said flues in a direction countercurrent to the movement of the ware through said tunnel including a suction fan communicating with said flues, dampers respectively interposed in the passages between said flues and said suction fan, automatic means for moving said dampers simultaneously to control the draft in both said flues simultaneously and in the same direction, means for blowing atmospheric air into said tunnel at a point adjacent to the exit end thereof and in a direction generally countercurrent to the movement of the glassware therethrough, means for withdrawing tunnel atmosphere from said tunnel in a zone extending toward the entrance end from the air inlet point of the last named means including a plurality of apertures communicating between the interior of said tunnel and the lower of said flues, means for controlling the drift through the hotter portions of said tunnel including apparatus responsive to flow of gaseous media longitudinally of said tunnel at an index point therein and arranged simultaneously to control the amount of atmospheric air forced into said tunnel and the amount of atmospheric air drawn into said lower flue at the exit end of said tunnel, whereby to control the proportion of the suction from said suction fan acting on said lower flue which is effective to withdraw tunnel atmosphere from said tunnel through said apertures, and means for insuring continuous application of suction to said lower flue including means for preventing the complete closure of the damper controlling the passage between the lower flue and the suction fan.

Signed at Hartford, Conn., this 23rd day of December, 1930.

HAROLD A. WADMAN.